United States Patent
Rexin et al.

(10) Patent No.: US 6,469,218 B1
(45) Date of Patent: Oct. 22, 2002

(54) PROCESS FOR PREPARING POLYETHER POLYOLS

(75) Inventors: Ornulf Rexin, Freiburg (DE); Rolf Mülhaupt, Freiburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/136,208

(22) Filed: May 1, 2002

(30) Foreign Application Priority Data

May 4, 2001 (DE) ......................... 101 21 807

(51) Int. Cl.[7] ................ C07C 43/11; C07C 31/18; C07C 27/00; C08G 59/68
(52) U.S. Cl. ............. 568/620; 568/852; 568/867; 528/408; 528/409
(58) Field of Search ................. 568/620, 852, 568/867; 528/408, 409

(56) References Cited

U.S. PATENT DOCUMENTS

| | | | |
|---|---|---|---|
| 4,029,879 A | 6/1977 | Muzzio | 536/4 |
| 4,129,718 A | 12/1978 | Muzzio | 536/4 |
| 4,482,750 A | 11/1984 | Hetzel et al. | 568/621 |
| 5,952,457 A | 9/1999 | Kouno et al. | 528/408 |
| 5,990,352 A | 11/1999 | Nobori et al. | 564/12 |
| 6,022,945 A | 2/2000 | Kouno et al. | 528/408 |
| 6,077,930 A | 6/2000 | Nobori et al. | 528/354 |
| 6,207,794 B1 | 3/2001 | Yamasaki et al. | 528/408 |

FOREIGN PATENT DOCUMENTS

JP 49-113892 10/1974

OTHER PUBLICATIONS

Encyclopedia of Polymer Science & Eng., vol. 6, New York, (month unavailable), 1986, pp. 273–307, 1,2–Epoxide Polymers.

Ullmanns Encyclopädie der industriellen Chemie, vol. A21, (month unavailable) 1992, pp. 670–671, Polyurethanes, Dieter Dieterich.

P. Wenzel, Dissertation, University of Freiburg, (month unavailable) 1998, pp. 163–165 & 170–171.

H.R. Friedel, Reaction Polymers, Hanser Verlag, Munich (month unavailable) 1992, p. 79, Reactants and Additives.

*Primary Examiner*—Deborah D. Carr
*Assistant Examiner*—Sikarl A. Witherspoon
(74) *Attorney, Agent, or Firm*—Joseph C. Gil; Lyndanne M. Whalen; Carolyn M. Sloane

(57) ABSTRACT

The invention is directed to a process for preparing a polyether polyol by the polyaddition of an alkylene oxide on to a starter compound containing active hydrogen atoms under basic catalysis in the presence of phosphonium cations.

4 Claims, No Drawings

PROCESS FOR PREPARING POLYETHER POLYOLS

TECHNICAL FIELD OF THE INVENTION

The present invention is directed to a process for preparing polyether polyols by polyaddition of alkylene oxides on to starter compounds containing active hydrogen atoms under basic catalysis in the presence of phosphonium cations.

BACKGROUND OF THE INVENTION

Polyether polyols are produced by polyaddition of alkylene oxides, for example, ethylene oxide, propylene oxide and butylene oxide, on to starter compounds containing active hydrogen atoms, for example, alcohols, amines, acid amides and phenols. Polyether polyols are used to prepare polyurethane plastics, surfactants and lubricants.

Polyaddition of epoxides on to starter compounds is typically carried out by alkali catalysis. Alkali metal hydroxides are conventionally used in alkali catalysis. Producing polyether polyols under alkali catalysis, however, has at least two disadvantages: 1. long reaction times (greater than 5 hours); and 2. expensive working-up of the polyether polyols in order to neutralize the alkaline polymers. See, for example, U.S. Pat. Nos. 4,129,718, 4,482,750, 4,029,879, and JP 7/326391, as well as *Encyclopedia of Polymer Science & Eng.*, Vol. 6, New York 1986, pages 273–307).

Base-catalyzed re-arrangement of epoxides, for example, propylene oxide, into allyl or propenyl alcohols, which proceeds as a side reaction in the preparation of polyether polyols, leads to undesirable mono-functional polyethers with terminal double bonds, so-called "mono-ols".

EP 763 555, EP 791 600, EP 879 838 and EP 916 686 all describe alkylene oxide polymerization by basic catalysis with phosphazene or phosphonium bases. These systems are all characterized by the presence of at least one P=N double bond. Basic catalysis systems used to produce polyether polyols have higher activities compared to alkali catalysis systems. As a result, reaction times are shorter and reactions are more selective, which leads to polyether polyols with low mono-ol content and high head-tail content.

Basic catalysis systems are, however, expensive to use. Additionally, the high cost of the catalysts used in basic catalysis systems adds to the expense of using such systems. Also, alkylene oxide polymerization by basic catalysis produces high molecular weight polyether polyols having an undesirable high double bond content. Furthermore, the stability of the phosphazene bases of basic catalysis systems is too low for industrial use, especially if the counter-ion is to be re-generated and re-used for further polyaddition cycles.

SUMMARY OF THE INVENTION

The object of the present invention is to provide a process for preparing polyether polyols by polyaddition of alkylene oxides on to starter compounds containing active hydrogen atoms under basic catalysis in the presence of phosphonium cations.

Compared with alkali metal hydroxides (e.g. KOH), phosphonium ions have higher activities. Additionally, phosphonium ions are more easily prepared and are therefore less expensive to use than the phosphazene bases known to date. Furthermore, phosphonium ions have a higher stability than the known phosphazene bases, which is very important not only for polyaddition, but also for re-generating and re-using the counter-ion.

DETAILED DESCRIPTION OF THE INVENTION

Compounds having molecular weights of 18 to 2,000 g/mol and 1 to 20 hydroxyl, thiol and/or amino groups are useful in the present invention as starter compounds containing active hydrogen atoms. Examples of such compounds are: methanol, ethanol, butanol, phenol, ethylene glycol, diethylene glycol, polypropylene glycol, 1,4-butanediol, hexamethylene glycol, bisphenol A, trimethylolpropane, glycerol, pentaerythritol, sorbitol, sucrose, degraded starch, water, methylamine, ethylamine, propylamine, butylamine, stearylamine, aniline, benzylamine, o- and p-toluidine, α,β-naphthylamine, ammonia, ethylenediamine, propylenediamine, 1,4-butylenediamine, 1,2-, 1,3-, 1,4-, 1,5- or 1,6-hexamethylenediamine, such as o-, m- and p-phenylenediamine, 2,4-toluylenediamine, 2,6-toluylenediamine, 2,2'-diaminodiphenylmethane, 2,4'-diaminodiphenylmethane and 4,4'-diaminodiphenylmethane and diethylenediamine, and compounds which contain functionalizable starter groups, such as allylglycerol, 10-undecenylamine, dibenzylamine, allyl alcohol and 10-undecenol.

Alkylene oxides preferably used in the present invention are ethylene oxides, propylene oxides, butylene oxides, styrene oxides, vinyloxiranes and mixtures thereof. The build-up of the polyether chains by alkoxylation can be accomplished by using only one monomeric epoxide, or randomly or blockwise with 2 or 3 different monomeric epoxides. Further details in this regard can be found in *Ullmanns Encyclopädie der industriellen Chemie*, Volume A21, 1992, p. 670 et seq.

The phosphonium cations useful in the present invention are represented by the structure (I)

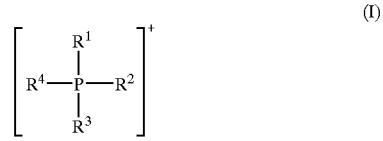

wherein $R^1$, $R^2$, $R^3$ and $R^4$ can be identical or different and, independently of one another, can be any hydrocarbon group having 1 to 30 carbon atoms, such as, for example, alkyl, aryl, arylalkyl, alkenyl or cycloalkyl, a thiol or thiophenol group or a primary, secondary or cyclic amino group, wherein no double bond of the phosphorus to an uncharged nitrogen atom may be present. In each case, two radicals from $R^1$, $R^2$, $R^3$ and $R^4$ can be joined together to a ring structure.

$R^1$, $R^2$, $R^3$ and $R^4$ are preferably primary or secondary amino groups. The phosphonium cations preferably used in the present invention are represented by the structure (2)

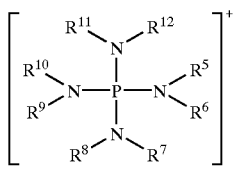
(2)

wherein $R^5$ to $R^{12}$ can be identical or different and, independently of one another, can be any hydrocarbon group having 1 to 30 carbon atoms, such as, for example, alkyl, aryl, arylalkyl, alkenyl or cycloalkyl, a thiol or a thiophenol groups or a primary, secondary or cyclic amino group. In each case, two radicals from $R^5$ to $R^{12}$ can be joined together to a ring structure.

More preferably, $R^1$, $R^2$, $R^3$ and $R^4$ are secondary amino groups, for example tetrakis-[cyclohexyl(methyl)amino]-phosphonium counter-ions wherein $R^5$, $R^7$, $R^9$ and $R^{11}$ are methyl and $R^6$, $R^8$, $R_{10}$ and $R^{12}$ are cyclohexyl. The phosphonium cations useful in the present invention can have any organic or inorganic anions as the counter-ion.

Tetrakis[cyclohexyl(methyl)amino]phosphonium tetrafluoroborate has a high stability with a half-life of 67 hours. This compound can be prepared in a simple synthesis sequence. See P. Wenzel, *Dissertation,* University of Freiburg 1998, 163. Tetrakis-(cyclohexylamino)-phosphonium chloride is prepared by first reacting cyclohexylamine with phosphorus pentachloride in methylene chloride. The chloride formed is then converted with sodium iodide into the iodide, which is then converted with aqueous sodium tetrafluoroborate solution into the desired tetrafluoroborate. Next, tetrakis-(cyclohexylamino)-phosphonium tetrafluoroborate is permethylated with dimethyl sulfate under phase transfer conditions to give tetrakis-[cyclohexyl (methyl)amino]phosphonium tetrafluoroborate, hereinafter abbreviated as $N_4P^+BF_4^-$.

To prepare the cation, for example, any desired salt, preferably tetrafluoroborate salts of the phosphonium compounds, are reacted with alkali metals or alkaline earth metal alcoholates, preferably potassium methylates. The poorly soluble alkali metal or alkaline earth metal terafluoroborates, preferably potassium tetrafluoroborates, precipitate out. Any reactive volatile reaction products (for example water or alcohol) formed here are removed (e.g., by distillation). Typically, 0.5 to 2 wt. % of the phosphonium salt, based on the total weight of the polyether polyol to be prepared, is used in the present invention.

Starter compounds containing active hydrogen atoms are partly de-protonated by phosphonium alcoholates. Reactive volatile reaction products (e.g. water or alcohol) formed here are removed, for example, by distillation. The degree of de-protonation is from 0.1 mol % to 90 mol %, preferably 1 mol % to 20 mol % of the total amount of active hydrogen atoms in the starter compound.

Polyaddition by the process of the present invention is carried out by metering the alkylene oxide into the cation. The speed of metering the alkylene oxide is chosen so that adequate temperature control is ensured under reaction conditions, such as reaction temperature and hydroxyl and catalyst concentration. Polyaddition is typically carried out at temperatures in the range of from 20 to 200° C., preferably, 40 to 180° C., more preferably, 50 to 150° C. The reaction can be carried out under an overall pressure of 0.0001 to 20 bar. The polyaddition can be carried out in bulk or in an inert organic solvent, such as e.g. toluene, xylene, ethylbenzene, tetrahydrofuran ("THF"), glyme or diglyme. The amount of solvent is usually 10 to 30 wt. %, based on the total weight of polyether polyol to be prepared. The reaction times are in the range of from a few minutes to several days, preferably, several hours.

The polyaddition can be carried out continuously or discontinuously, e.g. in a batch or a semi-batch process.

All known techniques for working-up polyether polyols for use in polyurethane production can, in principle, be used for working-up the alkaline polymers. See H. R. Friedel, *Reaction Polymers,* Hanser Verlag, Munich 1992, p. 79. Working-up the polyether polyol is preferably carried out by neutralization. The neutralization is preferably carried out by acidification with dilute mineral acid (e.g. sulfuric acid or phosphoric acid) with subsequent filtration or treatment with an adsorbent (e.g. magnesium silicate) or by filtration over an acid ion exchanger. Further purification by precipitation (e.g. from methanol in acetone) can follow. Finally, the product is freed from readily volatile contents under reduced pressure at temperatures of 20 to 200° C.

The starting product $N_4P^+BF_4^-$ can be recovered from the acid ion exchanger with a mixture of tetrafluoroboric acid and methanol. After purification of the salt, e.g. by recrystallization, it can be used again for catalysis.

The number-average molecular weight of the polyether polyols prepared by the process according to the present invention are in the range of from 100 to 50,000 g/mol, preferably, 1,000 to 20,000 g/mol. The molecular weight can be determined by gel permeation chromatography ("GPC"), MALDI-TOF (Matrix Assisted Laser Desorption Ionisation—Time of Flight) mass spectrometry or, preferably, by determination of the OH number. The polydispersities of the polyether polyols are less than 1.2, preferably less than 1.1, and can be determined with a GPC calibrated with polyethylene glycol standards.

EXAMPLES

The commercially obtainable phosphazene bases 1-tert-butyl-4,4,4-tris-(dimethylamino)-2,2-bis-[tris-(dimethylamino)-phosphoranylideneamino]-2$\lambda^5$,4$\lambda^5$-catenadi-(phosphazenium) tetrafluoroborate, hereinafter abbreviated as $BuP_4^+BF_4^-$, and 1,1,1,3,3,3-hexakis-(dimethylamino)-diphosphazenium tetrafluoroborate, hereinafter abbreviated as $P_2^+BF_4^-$, were used in the comparison Examples.

Example 1

Tetrakis[cyclohexyl(methyl)amino]phosphonium ion, hereinafter Abbreviated as $N_4P^+$, as the cation 780 mg of the phosphonium salt $N_4P^+BF_4^-$ was dissolved in methanol and the solution was stirred with a stoichiometric amount of a 3.60 M solution of potassium methylate in methanol at 25° C. for 1 hour. The colorless precipitate formed was filtered through a filter crucible (pore 4) and washed with methanol. The solvent was removed under reduced pressure. The $N_4P^+OMe^-$ obtained was initially introduced with 2.72 ml dipropylene glycol into a 250 ml glass reactor under inert gas conditions (argon) and the mixture was stirred at 90° C. for 1 hour. The methanol formed was removed in vacuo. 100 ml distilled propylene oxide was metered in at an oil bath temperature of 130° C. under reflux such that a small excess of monomer was always present in the reactor. When the addition had ended the reaction mixture was dissolved in 150 ml methanol and neutralized with an acid ion exchanger (AMBERLITE® IR-120, Merck KGaA, D-64295 Darmstadt). The ion exchanger was filtered off and the filtrate was freed from the solvent under reduced pressure. 54 g of a colorless, viscous liquid (η=682 mPa·s/25° C.) with a molecular weight of 3,500 g/mol (degree of polymerization 58) and a polydispersity of 1.05 was obtained. The OH number was 38.0 mg KOH/g. The polyol contained 38 mmol/kg of unsaturated compounds.

Example 2
(Comparison)

1,1,1,3,3,3-Hexakis-(dimethylamino)-diphosphazenium, Hereinafter Abbreviated as $P_2^+$, as the cation In a procedure analogous to Example 1, the cation was prepared from 886 mg $P_2^+BF_4^-$, 0.58 ml potassium methylate solution (3.60 M) and 2.72 ml dipropylene glycol. 100 ml distilled propylene oxide was metered in. After working up, 75 g of a colorless, viscous liquid (η=553 mPa·s/25° C.) with a molecular weight of 3,300 g/mol (degree of polymerization 55) and a polydispersity of 1.08 was obtained. The OH number was 36.3 mg KOH/g. The polyol contained 55 mmol/kg of unsaturated compounds.

Example 3
(Comparison)

1-tert-Butyl-4,4,4-tris-(dimethylamino)-2,2-bis-[tris-(dimethylamino)phosphoranylideneamino]-2λ5,4λ5-catenadi-(phosphazene), hereinafter abbreviated as $^tBuP_4H^+$, as the cation In a procedure analogous to Example 1, the cation was prepared from 1.50 g $^tBuP_4^+BF_4^-$, 0.58 ml potassium methylate solution (3.60 M) and 2.72 ml dipropylene glycol. 100 ml distilled propylene oxide was metered in. After working up, 79 g of a colorless, viscous liquid (η=652 mPa·s/25° C.) with a molecular weight of 3,300 g/mol (degree of polymerization 58) and a polydispersity of 1.03 was obtained. The OH number was 32.4 mg KOH/g. The polyol contained 60 mmol/kg of unsaturated compounds.

Example 4

Regeneration of $N_4P^+BF_4^-$

The ion exchanger containing the cation $N_4P^+$ is stirred with a mixture of tetrafluoroboric acid and methanol in a ratio of 1:8 at about 65° C. for several hours. After the ion exchanger has been filtered off, the $N_4P^+BF_4^-$ is precipitated out by the addition of water. The salt can be re-crystallized from isopropanol.

Example 5

Determination of the Half-lives of the Cations

The stability of the phosphazene and phosphonium cations was characterized by determination of the half-lives. See P. Wenzel, *Dissertation*, University of Freiburg 1998, 163. For this, the stability of the cation to the strongly basic and nucleophilic hydroxide ion in the presence of water was measured. A defined amount of the cation to be investigated was heated at 100° C. in the form of the chloride salt under phase transfer conditions in a system of 50% aqueous sodium hydroxide solution and chlorobenzene for up to 100 hours. The products were then extracted with methylene chloride and isolated. The content of un-dissociated cation was subjected to fractional crystallization from methanolic solution with sodium tetraphenylborate. From the amount of cation isolated, the half-life can be calculated by first order kinetics. The results are summarized in Table 1.

TABLE 1

Half-Life Of The Cations

| Cation | Half-life $t_{1/2}$ [h] |
|---|---|
| $N_4P^+$ | 67 |
| $P_2^+$ (Comparison) | 8 |
| $^tBuP_4H^+$ (Comparison) | 45 |

What is claimed is:

1. A process for preparing a polyether polyol by the polyaddition of an alkylene oxide on to a starter compound containing active hydrogen atoms under basic catalysis comprising converting from 0.1 to 90 mol % of the active hydrogen atoms of the starter compound to phosphonium salts before the polyaddition of the alkylene oxide, wherein the phosphonium cation is represented by the general structure (I)

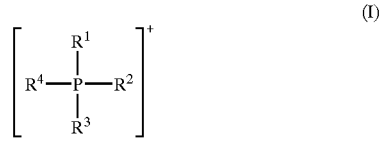

(I)

wherein
$R^1$, $R^2$, $R^3$ and $R^4$ can be identical or different and, independently of one another, can be any hydrocarbon group having 1 to 30 carbon atoms, wherein no double bond of the phosphorus to an uncharged nitrogen atom is present.

2. The process of claim 1, wherein the phosphonium cation is represented by the general structure (2)

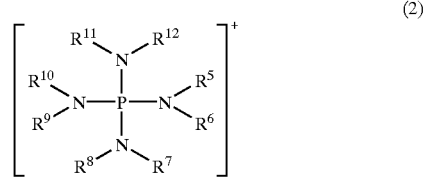

(2)

wherein
$R^5$ to $R^{12}$ can be identical or different and, independently of one another, can be any hydrocarbon group having 1 to 30 carbon atoms.

3. The process of claim 2, wherein the phosphonium cation is tetrakis-[cyclohexyl(methyl)amino]-phosphonium ion.

4. A process for preparing a polyether polyol comprising the steps of: (a) providing a starter compound containing active hydrogen atoms; (b) adding phosphonium alcoholate to the starter compound containing active hydrogen atoms to form a reaction mixture; (c) reacting the reaction mixture with an alkylene oxide to form a polyether polyol containing reactive mixture; (d) neutralizing the polyether polyol containing reactive mixture; and (e) isolating the polyether polyol from the polyether polyol containing reactive mixture.

* * * * *